(12) United States Patent
Schmid et al.

(10) Patent No.: US 10,525,822 B2
(45) Date of Patent: Jan. 7, 2020

(54) VENTING NIPPLE AND TANK DEVICE

(71) Applicant: MAGNA STEYR Fuel Systems GesmbH, Sinabelkirchen (AT)

(72) Inventors: Michael Schmid, Graz (AT); Kai Marek, Sebersdorf (AT); Stefan Neumeister, St. Margarethen/R. (AT)

(73) Assignee: MAGNA STEYR Fuel Systems GesmbH, Sinabelkirchen (AT)

( * ) Notice: Subject to any disclaimer, the term of this patent is extended or adjusted under 35 U.S.C. 154(b) by 0 days.

(21) Appl. No.: 15/942,874

(22) Filed: Apr. 2, 2018

(65) Prior Publication Data
US 2018/0370350 A1 Dec. 27, 2018

(30) Foreign Application Priority Data

Jun. 22, 2017 (EP) ..................................... 17177388

(51) Int. Cl.
*B60K 15/03* (2006.01)
*B60K 15/035* (2006.01)

(52) U.S. Cl.
CPC ............ *B60K 15/035* (2013.01); *B60K 15/03* (2013.01); *B60K 15/03177* (2013.01); *B60K 2015/03032* (2013.01); *B60K 2015/0346* (2013.01); *B60K 2015/03447* (2013.01); *B60K 2015/03493* (2013.01); *B60K 2015/03542* (2013.01)

(58) Field of Classification Search
CPC ................. B60K 15/03; B60K 15/035; B60K 15/03177; B60K 2015/03032; B60K 2015/03447; B60K 2015/0346; B60K 2015/03493; B60K 2015/03542

USPC .......................................................... 220/746
See application file for complete search history.

(56) References Cited

U.S. PATENT DOCUMENTS

| 2011/0139778 A1* | 6/2011 | Feichtinger | ......... B29C 45/1657 220/86.1 |
| 2014/0217094 A1* | 8/2014 | Wolf | ................ B60K 15/03177 220/86.2 |

FOREIGN PATENT DOCUMENTS

| EP | 0947368 A2 | 10/1999 |
| EP | 1705052 A2 | 9/2006 |
| EP | 3118042 A1 | 1/2017 |

\* cited by examiner

*Primary Examiner* — King M Chu
(74) *Attorney, Agent, or Firm* — Jordan IP Law, LLC; Todd A. Vaughn

(57) ABSTRACT

A ventilation nipple configured to ventilate a tank component that is composed of a plastic material, a tank device that includes such a ventilation nipple, and a method for producing such a tank device. The ventilation nipple includes a ventilation opening and a flange body arranged in an annular manner around the ventilation opening. The flange body has a first annular collar and a second annular collar each configured for connection via a weld connection to the tank component. The first annular collar and the second annular collar are arranged coaxially with respect to each other and also with respect to the ventilation opening. The first annular collar and the second annular collar define an annular hollow space configured to receive a sealing agent and/or an adhesive between the first annular collar and the second annular collar.

10 Claims, 2 Drawing Sheets

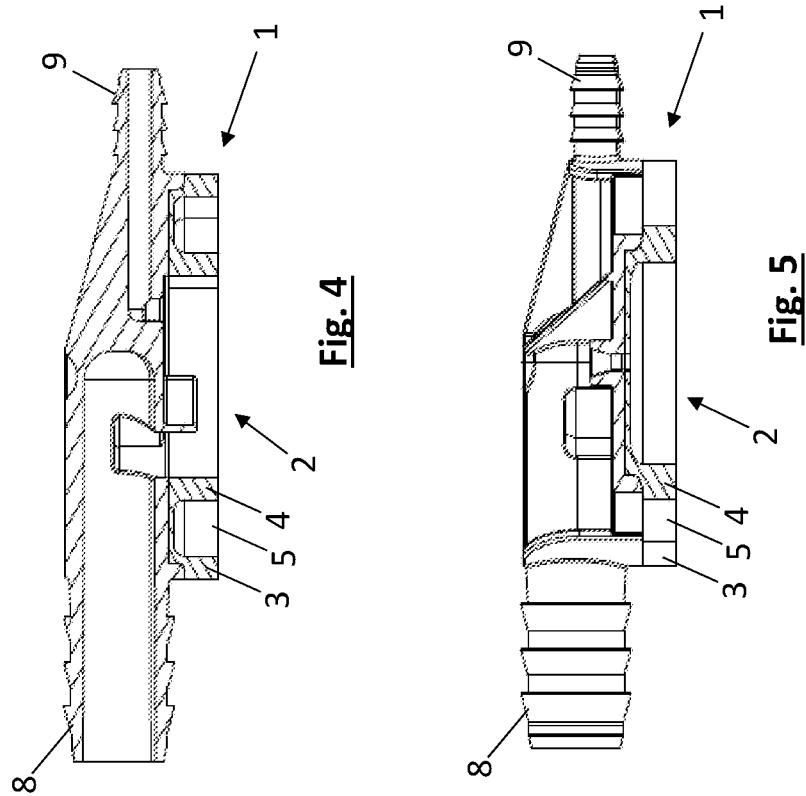
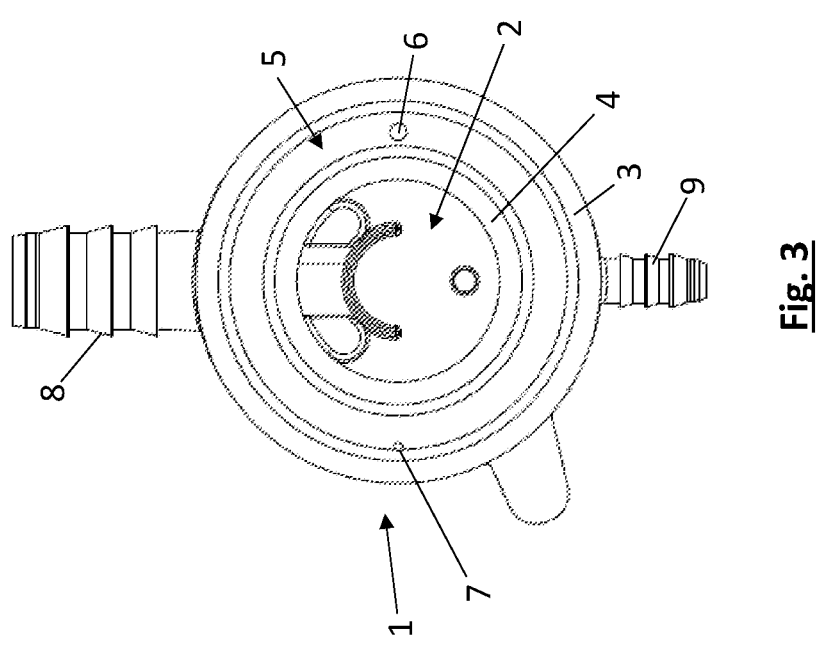

VENTING NIPPLE AND TANK DEVICE

CROSS-REFERENCE TO RELATED APPLICATIONS

The present application claims priority under 35 U.S.C. § 119 to European Patent No. EP 17177388.0, filed on Jun. 22, 2017, which is hereby incorporated by reference in its entirety.

TECHNICAL FIELD

Embodiments relate to a ventilation nipple configured to ventilate a tank component that is composed of a plastic material, a tank device comprising such a ventilation nipple and a method for producing such a tank device.

BACKGROUND

Ventilation nipples, particularly, ventilation devices which can be secured to an opening of a tank component in order to ventilate and/or aerate the tank component via fluid paths inside the ventilation nipple, and where applicable via ventilation lines which are connected to the ventilation nipple are known per se. Such ventilation nipples are used, in particular, to ventilate tanks and filling pipes for filling tanks in order to enable adequate ventilation and/or aeration during operation and/or during filling of the tank.

For example, European Patent Publication No. EP 3118042 A1 discloses such a ventilation nipple.

In connection with plastics tanks, recently ventilation nipples composed of a plastic material have also been used and can be welded in a simple manner to a tank composed of a plastic material or other tank components composed of a plastic material. Particularly when plastic material components are used together with fuel tanks in vehicles, however, it is desirable, in order to protect the environment, to prevent undesirable hydrocarbon emissions as a result of the plastic material to the greatest possible extent.

SUMMARY

In accordance with embodiments, a ventilation nipple is configured to ventilate a tank component composed of a plastic material, and which reduces undesirable hydrocarbon emissions in the region of the ventilation nipple.

In accordance with embodiments, a tank device is provided that comprises a ventilation nipple, and a method for producing such a tank device, wherein the hydrocarbon emissions are always intended to be reduced during operation of the tank device.

In accordance with embodiments, a ventilation nipple configured to ventilate a tank component which is composed of a plastic material, wherein the ventilation nipple has a flange composed of a plastic material configured for being connected to the tank component via a weld connection, the flange also being configured for arrangement in an annular manner around a ventilation opening of the ventilation nipple.

In accordance with embodiments, the flange has a first annular collar and a second annular collar that are coaxially arranged with respect to each other, and an annular hollow space configured to receive a sealing agent and/or adhesive provided between the first annular collar and the second collar annular collar.

In accordance with embodiments, a flange for securing a ventilation nipple is constructed with two coaxial annular collars so that the two collars form an annular space, which faces the tank component and is configured to be connected via a weld connection so that the annular hollow space is sealed/closed off via a face of the secured tank component.

In accordance with embodiments, a flange having a first annular collar and a second annular collar arranged coaxially around the ventilation opening of the ventilation nipple are to be connected to the tank component via a weld connection, in particular, via a corresponding ventilation opening of the tank component itself so that ventilation of the tank component may be carried out via the ventilation nipple.

Via such a ventilation nipple, an annular hollow space is provided in the region of the weld connection of the ventilation nipple, the annular hollow space configured to be filled with a sealing agent or adhesive. As a result of the arrangement of a sealing agent and/or adhesive in the region of the weld connection, weak locations of the barrier of the hydrocarbon emissions as a result of the weld connection between the ventilation nipple to the tank component which can lead to increased permeation in this region are prevented.

In accordance with embodiments, the ventilation nipple comprises an injection hole which is configured for connection to an outer space, including after formation of the weld connection between the ventilation nipple to the tank component. Advantageously, in this way the annular hollow space is accessible from the outer side and the sealing agent and/or the adhesive may be introduced through the injection hole, even after formation of the weld connection.

In accordance with embodiments, the ventilation nipple also comprises a ventilation hole which connects the outer space, including after forming the weld connection between the ventilation nipple and the tank component, to the annular hollow space to permit the flow and escape of air through the ventilation hole, even after welding to the tank component. In particular, via the ventilation hole, air may be guided from the annular hollow space during the filling of sealing agent and/or adhesive.

In accordance with embodiments, the ventilation hole is configured to be arranged at the side of the annular hollow space opposite the injection hole so that the ventilation hole opens at that location into the annular hollow space.

In accordance with embodiments, the ventilation nipple comprises at least a first connection member configured for fluidic connection to the ventilation opening. For example, such a first connection member may comprise a valve. The first connection member may also comprise retention ribs configured to secure a hose or another fluid connection line. Particularly, the first connection member may be located substantially normally on the flange of the ventilation nipple so as to protrude laterally from the installed ventilation nipple. Alternatively, the first connection member may be located so that the flange is extended in a manner so that it is located in the installation position normal on the surface of the tank component.

In accordance with embodiments, the ventilation nipple may also comprise at least a second connection member which is different from the first connection member. The second connection member is configured for fluidic connection to the ventilation opening. The second connection member may comprise retention ribs. The second connection member may also be arranged so as to protrude laterally from the ventilation nipple opposite the first connection member.

In accordance with embodiments, a tank device may comprise a tank component composed of a plastic material; and a ventilation nipple (as described herein) configured to ventilate the tank component, wherein the ventilation nipple comprises a flange having a first annular collar and/or a second annular collar connected via a weld connection to the tank component; and an annular hollow space arranged between the first annular collar and the second annular collar, and configured to receive a sealing agent and/or an adhesive. The tank component provided with such a ventilation nipple comprises a plastic material tank or a plastic material filling pipe.

In accordance with embodiments, the sealing agent and/or the adhesive may be a product of the family Loctite® 5810™ from the company Henkel Corporation, in particular, Loctite® 5810B™.

In accordance with embodiments, a method of producing a tank device comprises connecting a ventilation nipple (comprising a flange having a first annular collar and a second annular collar) to the tank component via a weld connection; and, after the connecting, injecting a sealing agent and/or an adhesive into an annular hollow space arranged between the first annular collar and the second annular collar. The injection may be conducted through an injection hole of the ventilation nipple which leads into the hollow space. In particular, the sealing agent and/or the adhesive may be injected into the hollow space until it is discharged again at the ventilation hole of the hollow space.

DRAWINGS

Embodiments will be illustrated by way of example in the drawings and explained in the description below.

FIG. 3 illustrates a plan view from below of the ventilation nipple of FIG. 1.

FIG. 4 illustrates a centrally sectioned view of the ventilation nipple of FIG. 3.

FIG. 5 illustrates a laterally sectioned view of the ventilation nipple of FIG. 3.

DESCRIPTION

Figure 1:
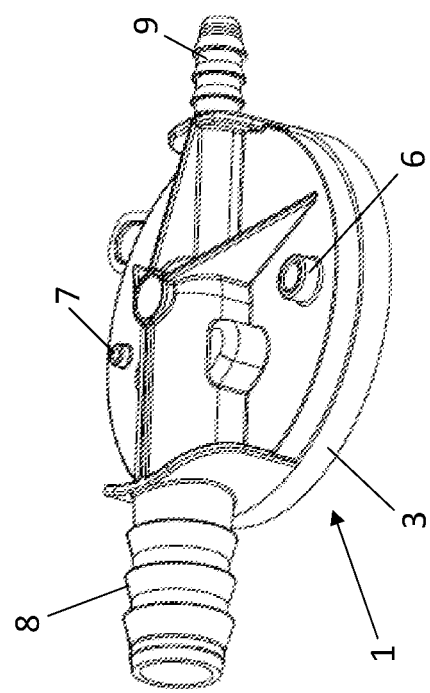
FIG. 1 illustrates a perspective view from below of a ventilation nipple, in accordance with embodiments.
Figure 2:
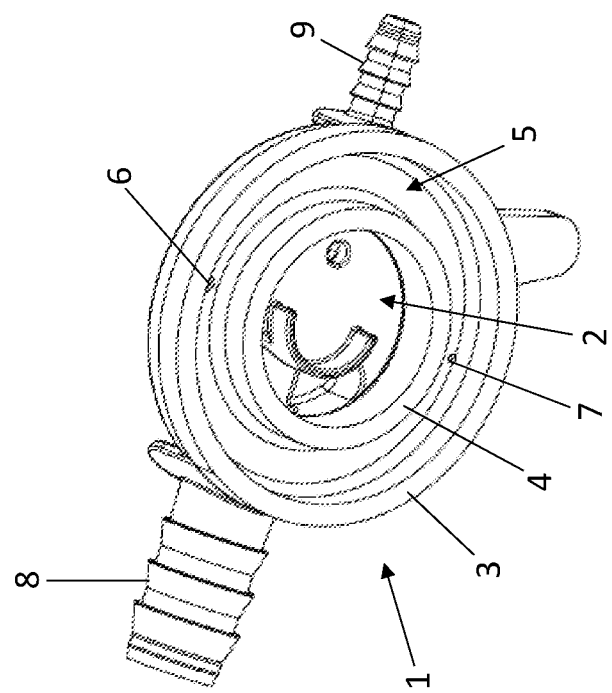
FIG. 2 illustrates a perspective view from below of the ventilation nipple of FIG. 1.

As illustrated in FIGS. 1 to 5, a ventilation nipple in accordance with embodiments is configured to ventilate a tank component which is composed of a plastic material. The ventilation nipple comprises a flange body 1 which defines in an annular manner a central ventilation opening 2. The flange body 1, in the same manner as the entire ventilation nipple, comprises a plastic material. The flange body 1 is configured for connection to a tank component (e.g., a plastic material tank or a plastic material filling pipe) via a weld connection in such a manner that the central ventilation opening 2 of the ventilation nipple is arranged over a corresponding ventilation opening of the tank component so that ventilation of the tank component may be carried out via the ventilation nipple.

The flange body 1 has a first annular collar 3 and a second annular collar 4 arranged coaxially relative to each other and also coaxially relative to the ventilation opening 2 of the ventilation nipple. The first annular collar 3 and the second annular collar 4 are configured for connection to the tank component via a weld connection.

The first annular collar 3 and the second annular collar 4 are spaced apart to define an annular hollow space 5 configured to receive a sealing agent and/or an adhesive between the first collar 3 and the second collar 4. During subsequent use, this hollow space 5 may also filled with the sealing agent and/or adhesive. The sealing agent and/or the adhesive may comprise, for example, Loctite® 5810B™.

The flange body 1 also includes an injection hole 6 that extends through a top surface and a bottom surface thereof in order to introduce the adhesive or sealing agent. The injection hole 6 is arranged parallel to the axis of the flange 1 and fluidically connects an outer space, e.g., a space which is located outside the ventilation nipple after welding of the ventilation nipple, to the annular hollow space 5 to thereby permit the injection of the sealing agent and/or the adhesive through the injection hole 6, even after welding of the flange body 1 to the tank component.

At an end opposite to the hollow space 5, the flange body 1 also includes a ventilation hole 7 which also fluidically connects the outer space, even after welding of the ventilation nipple to the tank component, to the annular hollow space 5 to thereby permit the flow and escape of air through the ventilation hole 7. When the hollow space 5 is filled with the sealing agent and/or adhesive, the sealing agent and/or the adhesive may be introduced via the injection hole 6 into the annular space 5 until the sealing agent and/or the adhesive is discharged through the ventilation hole 7.

The flange body 1 further includes a first connection member 8 having a first size, and a second connection member 9 having a second size that is less than the first size. The first connection member 8 and the second connection member 9 are both fluidically connected to the ventilation opening 2 by the flange body 1. The first connection member 8 and the second connection member 9 are used for connection to a connection line, for example, a hose. The connection line may be retained on the first connection member 8 and the second connection member 9 via conically expanding retention ribs provided on the first connection member 8 and the second connection member 9.

The term "coupled," "attached," or "connected" may be used herein to refer to any type of relationship, direct or indirect, between the components in question, and may apply to electrical, mechanical, fluid, optical, electromagnetic, electromechanical or other connections. In addition, the terms "first," "second, etc. are used herein only to facilitate discussion, and carry no particular temporal or chronological significance unless otherwise indicated.

This written description uses examples to disclose the invention, including the preferred embodiments, and also to enable any person skilled in the art to practice the invention, including making and using any devices or systems and performing any incorporated methods. The patentable scope of embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, may be mixed and matched by one of ordinary skill in the art to construct additional embodiments and techniques in accordance with principles of this application.

LIST OF REFERENCE SYMBOLS

1 Flange body
2 Central ventilation opening
3 First collar
4 Second collar 5 Annular hollow space
6 Injection hole
7 Ventilation hole
8 First connection member
9 Second connection member

What is claimed is:

1. A ventilation nipple for a tank component which is composed of a plastic material, the ventilation nipple comprising:
    a ventilation opening;
    a flange body, composed of a plastic material, and arranged in an annular manner around the ventilation opening, the flange body having a first annular collar and a second annular collar each configured for connection to the tank component, the first annular collar and the second annular collar being arranged coaxially with respect to each other and also with respect to the ventilation opening, the first annular collar and the second annular collar defining an annular hollow space configured to receive a sealing agent and/or an adhesive between the first annular collar and the second annular collar; and
    an injection hole which is to fluidically connect the annular hollow space to a space outside of the flange body and thereby permit introduction of the sealing agent and/or the adhesive through the injection hole even after connection of the flange body to the tank component.

2. The ventilation nipple of claim 1, further comprising a ventilation hole which is to fluidically connect the annular hollow space to space outside of the flange body, to permit a flow and escape of air through the ventilation hole even after connection of the flange body to the tank component.

3. The ventilation nipple of claim 2, wherein the ventilation hole opens at a side of the annular hollow space opposite the injection hole into the annular hollow space.

4. The ventilation nipple of claim 1, further comprising a first connection member having first retention ribs, the first connection member configured to extend from the flange body for fluidic connection to the ventilation opening.

5. The ventilation nipple of claim 4, further comprising a second connection member having second retention ribs, the second connection member configured to extend from the flange body for fluidic connection to the ventilation opening.

6. A tank device comprising:
    a tank component composed of a plastic material; and
    a ventilation nipple including:
        a ventilation opening;
        a flange body, composed of a plastic material, and arranged in an annular manner around the ventilation opening, the flange body having a first annular collar and a second annular collar each configured for connection via a weld connection to the tank component, the first annular collar and the second annular collar being arranged coaxially with respect to each other and also with respect to the ventilation opening, the first annular collar and the second annular collar defining an annular hollow space configured to receive a sealing agent and/or an adhesive between the first annular collar and the second annular collar; and
        an injection hole which is to fluidically connect the annular hollow space to a space outside of the flange body and thereby permit introduction of the sealing agent and/or the adhesive through the injection hole even after connection of the flange body to the tank component.

7. The tank device of claim 6, wherein the ventilation nipple further includes a ventilation hole which is to fluidically connect the annular hollow space to space outside of the flange body, to permit a flow and escape of air through the ventilation hole even after connection of the flange body to the tank component.

8. The tank device of claim 7, wherein the ventilation hole opens at a side of the annular hollow space opposite the injection hole into the annular hollow space.

9. The tank device of claim 6, wherein the ventilation nipple further includes a first connection member having first retention ribs, the first connection member configured to extend from the flange body for fluidic connection to the ventilation opening.

10. A method of producing a tank device, the method comprising:
    providing a tank component composed of a plastic material and a ventilation nipple composed of a plastic material, the ventilation nipple including a ventilation opening and a flange body arranged in an annular manner around the ventilation opening, the flange body having a first annular collar and a second annular collar arranged coaxially with respect to each other and also with respect to the ventilation opening, the first annular collar and the second annular collar defining an annular hollow space;
    connecting the tank component to the ventilation nipple at the first annular collar and the second annular collar via a weld connection; and
    injecting a sealing agent and/or an adhesive, after connecting the tank component to the ventilation nipple, into the annular hollow space; and an injection hole which is to fluidically connect the annular hollow space to a space outside of the flange body and thereby permit introduction of the sealing agent and/or the adhesive through the injection hole even after connection of the flange body to the tank component.

* * * * *